(12) United States Patent
Liang et al.

(10) Patent No.: US 6,697,575 B1
(45) Date of Patent: Feb. 24, 2004

(54) SYSTEM AND METHOD FOR INCREASING CAPACITY OF LONG-HAUL OPTICAL TRANSMISSION SYSTEMS

(75) Inventors: Anhui Liang, Eatontown, NJ (US); Chinlon Lin, Holmdel, NJ (US); Bo Pedersen, Annapolis, MD (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 374 days.

(21) Appl. No.: 09/608,768

(22) Filed: Jun. 30, 2000

(51) Int. Cl.[7] .............................................. H04B 10/00
(52) U.S. Cl. ..................... 398/104; 398/42; 398/41; 398/134; 398/141
(58) Field of Search ................................ 359/141, 152, 359/113–114, 173, 179; 398/104, 105, 134, 41–42, 141, 178, 25, 29

(56) References Cited

U.S. PATENT DOCUMENTS

| | | | | |
|---|---|---|---|---|
| 5,742,416 A | * | 4/1998 | Mizrahi ....................... | 359/134 |
| 5,995,259 A | * | 11/1999 | Meli et al. ................... | 359/134 |
| 6,356,384 B1 | * | 3/2002 | Islam .......................... | 359/334 |
| 6,493,133 B1 | * | 12/2002 | Liang et al. ................. | 359/349 |

* cited by examiner

Primary Examiner—Kinfe-Michael Negash
(74) Attorney, Agent, or Firm—Devine, Millinet & Brandi; Kevin J. Carroll

(57) ABSTRACT

A method of increasing capacity on a long-haul undersea cable system having at least one optical fiber, said method comprising interleaving counter-propagating forward-propagating and backward-propagating signals in forward and backward channels on a common optical fiber, wherein the wavelength offset between said forward and backward channels is typically half of the channel spacing of co-propagating signals.

16 Claims, 4 Drawing Sheets

SYSTEM AND METHOD FOR INCREASING CAPACITY OF LONG-HAUL OPTICAL TRANSMISSION SYSTEMS

FIELD OF INVENTION

The present invention relates generally to long-haul, optical fiber transmission systems. More particularly, the present invention relates to increasing the capacity of undersea cable systems.

STATEMENT OF PROBLEM

An undersea network of fiber-optic telecommunication cables links continents, nations and lands together. Communication traffic on these submarine cables has increased dramatically in recent years and is expected to continue to grow as a result of many factors, including, for example, the globalization of world economies and businesses, the increased demand for international communications capabilities, and the development of multimedia applications and revolutionary resources such as the Internet. These factors necessitate increasing capacity not only by adding cables, but also by optimizing the operation of existing submarine cables. The term "capacity" as used herein refers to the total bit rate of the cable system which is the sum of the bit rates of each channel on all the fibers within a cable.

Approaches for increasing capacity on existing cables have traditionally targeted optimizing bandwidth utilization. Long-haul optical fiber transmission paths, such as those employed by undersea cables, typically are over 1000 km in length and operate in the C-band. The C-band spans from about 1525 to about 1570 nm and is optimal for low-absorption losses. Within the C-band, capacity may be increased by increasing the number of channels and the bit rate of the channels. Most long-haul cable systems increase capacity by increasing the number channels through wavelength division multiplexing (WDM). The ultimate capacity of a WDM fiber system depends on how closely channels can be packed in the wavelength domain. Minimum channel spacing is limited, however, by the extent of interchannel crosstalk and degradation of the signal to noise ratio (SNR). Typically, channel spacing in GHz should exceed three times the bit rate in Gb/s. For example, for a bit rate of 10 Gb/s, the channel spacing should be at least 30 GHz. Therefore, for a given bandwidth, the number of channels and bit rate are interrelated and limit the capacity of a cable.

One approach to increase useable bandwidth involves using the L-band in addition to the C-band. The L-band refers to the bandwidth of about 1570 to about 1610 nm. Combining the L-band with the C-band expands the useable bandwidth from 1525–1570 (45 nm) to 1525–1610 nm (85 nm). Although using the L-band would increase bandwidth, it introduces other problems which have limited its implementation. For example, inter-channel Raman crosstalk between the C-band and the L-band tends to be significant. More specifically, in multiple channels systems, the fiber acts as a Raman amplifier such that long-wavelength channels are amplified by short wavelength channels that are within the bandwidth of the Raman gain. The shortest wavelength within the bandwidth of the Raman gain becomes the most depleted as it may pump many channels of longer wavelengths simultaneously. The signal-dependent amplification leads to power fluctuations which add to receiver noise and degrade receiver performance.

The Raman effects between the C- and L-bands are particular problematic compared to the effects just within the C-band. Given the conventional operating bandwidth within the C-band of less than 45 nm, the Raman effects between channels tend to be insignificant since the peak Raman Stokes shift is about 105 to about 120 nm from the pump wavelength. However, when the C- and L-bands are combined and form a bandwidth of close to 85 nm, the wavelength difference between the shortest and longest channels is near the peak Raman Stokes Shift.

Transmitting over the wide bandwidth of the combined C- and L-bands (85 nm) also presents problems in fiber configuration. For example, an optical fiber needs to have a low dispersion slope over the operating bandwidth such that the amount of dispersion is relatively constant across the bandwidth to minimize gain ripple. Tailoring a fiber to provide a low dispersion slope over a 45 nm bandwidth can be accomplished using known techniques such as modifying the core radius and/or index difference. However, providing a fiber having a low dispersion slope over an 85 nm wavelength (i.e., C-band+L-band) is more difficult.

Aside from dispersion, fiber loss also tends to be problematic in the L-band. Fiber loss reduces the average power reaching the receiver and results from several factors including material absorption and Rayleigh scattering. Material absorption refers to electronic and vibrational resonances associated with specific molecules within the fiber. Rayleigh scattering results from random localized variations of molecular positions in glass that create random inhomogeneities of the reflective index and act as tiny scatter centers. These fiber losses tend to be high in the L-band, which becomes particularly problematic in long-haul optical transmission paths such as undersea fibers.

Complicating high absorption losses in the L-band are the problems associated with using erbium-doped fiber amplifiers (EDFAs) in L-band amplification. One of the more significant problems with L-band EDFAs is the relatively-high pump power compared to that of C-band EDFAs which tend to have higher power conversion efficiency. Thus, not only are additional amplifiers needed to overcome the losses in the L-band, but also each amplifier requires more power than its C-band counterpart. Since power input to an undersea cable is limited due to the limited access to an undersea cable, it is extremely difficult if not practically impossible to allocate sufficient power to the required number of EDFAs for an L-band transmission over long-hauls of 6,000 to 10,000 km. Further, the additional power requirements necessitate more laser diode pumps than a comparable C-band amplifier. Aside from cost, the increased number of laser diodes also increases the size of the amplifier. It is important that the amplifiers be small enough, however, to be contained by a repeater, which, in turn, is small enough to be conveniently deployed during the cable laying process. Minimizing the size of the amplifier is also important to facilitate the use of existing manufacturing equipment and techniques (and thereby reduce costs) and to provide adequate heat dissipation by situating the heat-generating components near an outer surface.

In addition to high power requirements for L-band EDFAs, the length of the erbium-doped fiber (EDF) also tends to be significantly longer than that of the C-band counterpart. For example, a typical undersea C-band EDFA requires about a 10–20 m erbium-doped fiber (EDF), while the EDF for an L-band amplifier of comparable gain would be more than 100 m long. A longer EDF has a number of drawbacks including higher costs, temperature sensitivity, excess dispersion, polarization mode dispersion, higher noise figure, and dispersion and polarization dependent losses.

Therefore, the above problems associated with Raman effects, non-uniform fiber dispersion, fiber loss and amplification militate against the use of L-band in long-haul cable systems.

Another approach contemplated by the applicants for increasing capacity involves the use of counter-propagating signals in channels of the same wavelength, preferably within the C-band. By using counter-propagating-signals in each channel the capacity of the fiber would be effectively doubled. Despite the increase in capacity, however, applicants also recognize that the effects of backward Rayleigh scattering (BRS) over cascading amplifiers would be problematic on long-haul cable systems.

BRS is a component of Rayleigh scattering from the silica medium of an optical fiber and propagates at the same wavelength but in the opposite direction of the signal generating it. Since BRS has the same wavelength as the counter-propagating signal, eliminating or even reducing BRS is difficult and cannot be accomplished using simple and commercially-available isolators.

In cascading-amplifier configurations, the BRS begins to saturate the amplifiers and reduce the gain of the counter-propagating signals in the same channel. This results in the signal level dropping relative to BRS along the transmission path, and the SNR degrading to unacceptable levels. Therefore, applicants believe using counter-propagating signals in the same channel is not a viable approach for increasing capacity over long-haul systems.

Therefore, a need exists for increasing capacity on new and existing long-haul optical transmission paths that is cost effective and efficient while maintaining the integrity of the transmitted signal. The present invention fulfills this need among others.

SUMMARY OF INVENTION

The present invention provides for increased capacity on long-haul optical transmission paths, such as undersea cables, by interleaving counter-propagating signals within the C-band. The interleaving counter-propagating signals are separated by a wavelength offset which is preferably less than that required to isolate co-propagating signals using conventional wavelength filtering techniques. Rather than isolating channels based on wavelength as is done in co-propagating signals, the present invention provides for isolation of the counter-propagating signals based on direction of propagation. This way, the wavelength offset between the counter-propagating signals is less than that ordinarily used in conventional co-propagating signals. By minimizing the wavelength offset between the counter-propagating signals, the total number of channels within the C-band is increased, thus, increasing capacity within a given bandwidth.

Increasing capacity within the C-band by interleaving counter-propagating signals overcomes many of the problems described above. In particular, by keeping the bandwidth narrow, the present invention minimizes Raman effects between the signals and facilitates the use of well known and commercially-available, low-dispersion slope fibers. Additionally, by operating within the C-band, absorption losses are minimized and amplification can be performed without the need for an excessive number of C+L-band amplifiers which tend to be relatively-large (long EDF), inefficient (high power consumption) and complex (low dispersion slope over wide bandwidth) as mentioned above.

The present invention also avoids the problems associated with BRS on long-haul systems as described above by interleaving the counter-propagating signals. More specifically, the wavelengths of the BRS generated by signals moving in one direction are different from the wavelength of the counter-propagating signals. This wavelength difference allows the BRS to be filtered relatively easily compared to counter-propagating signals in the same channel where the BRS have the same wavelength and thus cannot be distinguished based on wavelength.

Therefore, by using interleaving counter-propagating signals on closely-packed channels, capacity is increased within a given bandwidth while still providing the ability to isolate the signals and reduce BRS.

Accordingly, one aspect of the present invention is a method of increasing capacity by interleaving counter-propagating signals. In the preferred embodiment, the method comprises interleaving forward-propagating signals and backward-propagating signals in forward and backward channels, respectively, within the c-band on a common optical fiber, wherein the forward-propagating and backward-propagating signals are separated by a wavelength offset that is less than that typically required for isolation between co-propagating signals. Preferably, the wavelength offset (in GHz) is about half of channel spacing of signals in the same direction. For example, if the bit rate is 10 Gb/s, and the channel spacing in same directional signals is 30 GHz, then the wavelength offset between the forward-propagating and backward-propagating signals is preferably less than 15 GHz Another aspect of the present invention is a method for amplifying interleaving counter-propagating signals over a long-haul between cable sections.

Yet anther aspect of the invention is an amplifier system for amplifying interleaving counter-propagating signals for a long-haul cable system. In a preferred embodiment, the amplifier system comprises: (a) optics for isolating inter-leaved counter-propagating signals such that each signal propagates on a discrete fiber, and for combining the counter-propagating signals of each discrete fiber on a optical fiber; (b) a filter for reducing BRS on one or both of the discrete optical fibers; and (c) at least one amplifier on each discrete optical fiber for band amplifying the signals on each discrete optical fiber.

Still another aspect of the present invention is a long-haul cable system configured for interleaving counter-propagating signals. In a preferred embodiment, the system comprises: (a) a long-haul cable comprising at least one optical fiber; (b) two or more cable stations connected to the long-haul cable; and (c) a plurality of amplifier systems as described above disposed along the optical fiber.

DETAILED DESCRIPTION OF PREFERRED EMBODIMENT

The present invention provides a system and method of interleaving counter-propagating signals on long-haul transmission paths, such as undersea systems, to increase capacity within the C-band. Throughout this disclosure reference is made to forward-propagating and backward-propagating signals counter-propagating in forward and backward directions in forward-propagating and backward-propagating interleaving channels ($CH_1$, $CH_2$), respectively. The term "interleaving" is well known and refer to the alternating two sets of channels along a bandwidth. Likewise, the term "counter-propagating" is well known in the art and refers to signals moving in opposite directions on a common optical fiber. For purposes of illustration herein, the forward direction refers to a signal propagating along an optical fiber from left to right while viewing the optical fiber (or representation thereof) from the side, while the backward direction refers to a signal propagating from right to left while viewing the optical fiber from the same side. It should be understood that reference to forward and backward directions is only for illustrative purposes herein and should not be construed to limit the scope of the claimed invention.

Figure 1:
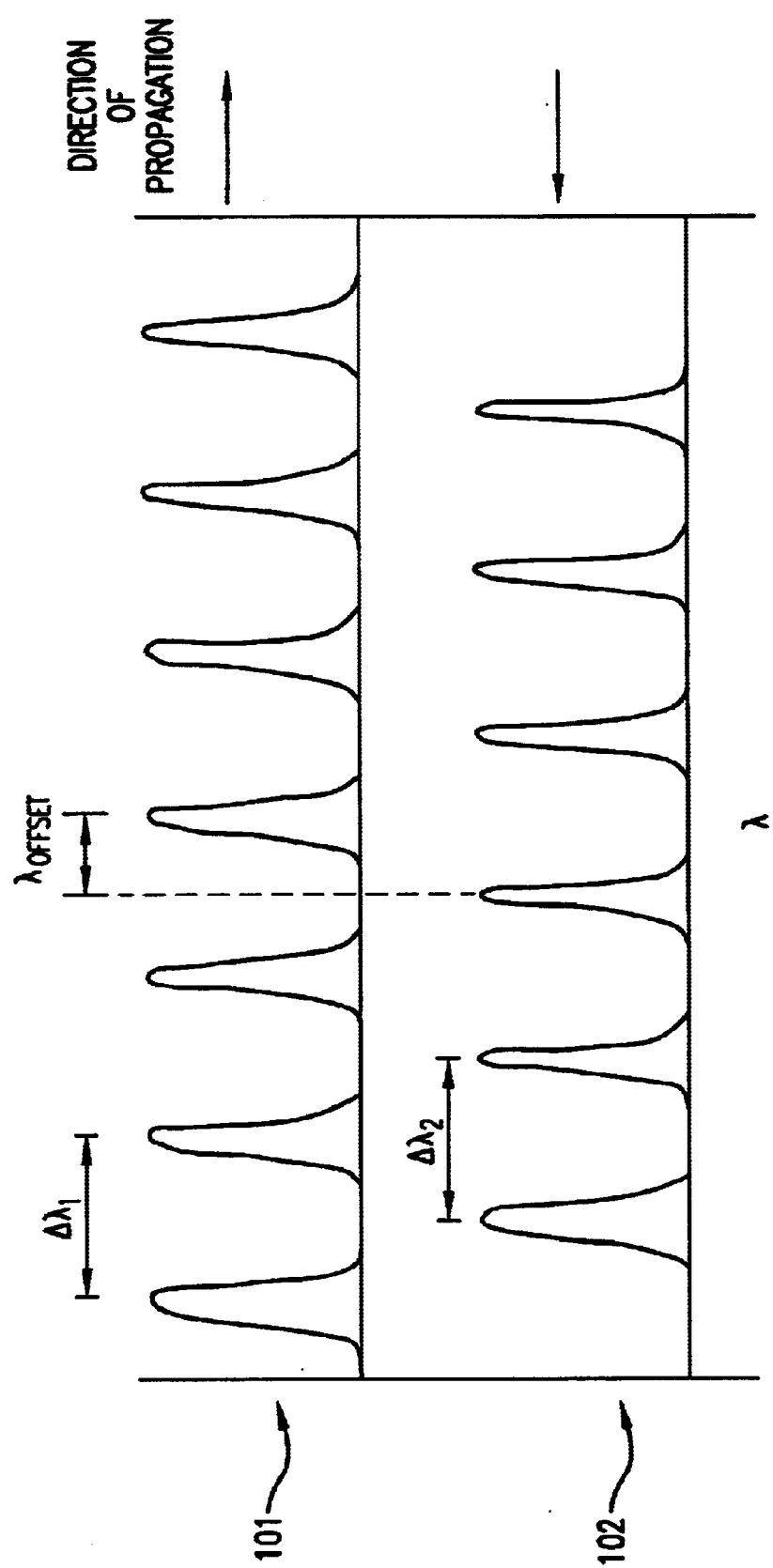
FIG. 1 shows a schematic diagram of interleaved counter-propagating signals.

FIG. 1 shows forward-propagating and backward-propagating signals 101, 102, counter-propagating in forward and backward directions, respectively. The channel spacing between the forward-propagating signals 101 ($\Delta\lambda_1$) and between the backward-propagating signals 102 ($\Delta\lambda2$) is preferably consistent e.g. reduce non-linear effects and sufficient to isolate copropagating signal using conventional tunable filtering devices, such as Fabry-Perot filters and Mach-Zehnder wavelength multiplexers, which effect isolation based on wavelength differences. Generally, the minimum channel spacing in GHz should exceed about three times the bit rate in Gb/s, although, as technology develops, it is anticipated that this ratio will decrease. At this time, a minimum channel spacing is about 10 to about 100 GHz. It should be understood though that the present invention is independent of a particular channel spacing value and may be practiced with lower values. Furthermore, the present invention allows for the channel spacing to be increased to improve SNR while nevertheless maintaining capacity by narrowing the wavelength offset to "absorb" the lost capacity from the increased channel spacing as discussed below.

The forward-propagating and backward-propagating counter-propagating signals are separated by a wavelength offset ($\lambda_{offset}$), which preferably is consistent between all the counter-propagating signals. The wavelength offset is more narrow than that generally preferred for effecting isolation between signals using well known and commercially-available wavelength insolation devices. As mentioned above, the present invention provides for the isolation of counter-propagating signals not according to wavelength, but rather according to direction of propagation. This way, the wavelength offset between the bidirectional signals is less than that ordinarily transmitted in conventional co-propagating signals. The wavelength offset in GHz is preferably no greater than about 3 times the bit rate in Gb/s, more preferably, no greater than about 2 times, and, even more preferably, no greater than about 1.5 times. For example, in a system having a bit rate of about 10 Gb/s, the wavelength offset preferably is no greater than 30 GHz, more preferably, no greater than about 20 GHz, and even more preferably, no greater than about 15 GHz.

It is preferable, although not necessary, to interleave the first and backward-propagating signals such that the wavelength offset on either side of a signal is equal. In other words, preferably the forward-propagating signals each have a wavelength that is equidistant from those of adjacent backward-propagating signals. According to such a preferred embodiment, the wavelength offset is half the channel spacing. For example, for a channel spacing of about 40 GHz, the wavelength offset would be 20 GHz. By decreasing the wavelength offset between channels, the capacity within a given bandwidth increases.

Although it is preferable to narrow the wavelength offset to increase capacity, applicants recognize that this wavelength offset nevertheless should be sufficient to filter BRS. More specifically, since counter-propagating signals will produce BRS having the same wavelength as the signals, the wavelength offset needs to be adequate to provide for filtering of the BRS of the signals from adjacent counter-propagating signals. In a preferred embodiment, the wavelength offset in GHz is no less than about 1 time the bit rate in Gb/s, and, in a more preferred embodiment, no less than about 1.2 times.

Figure 2:
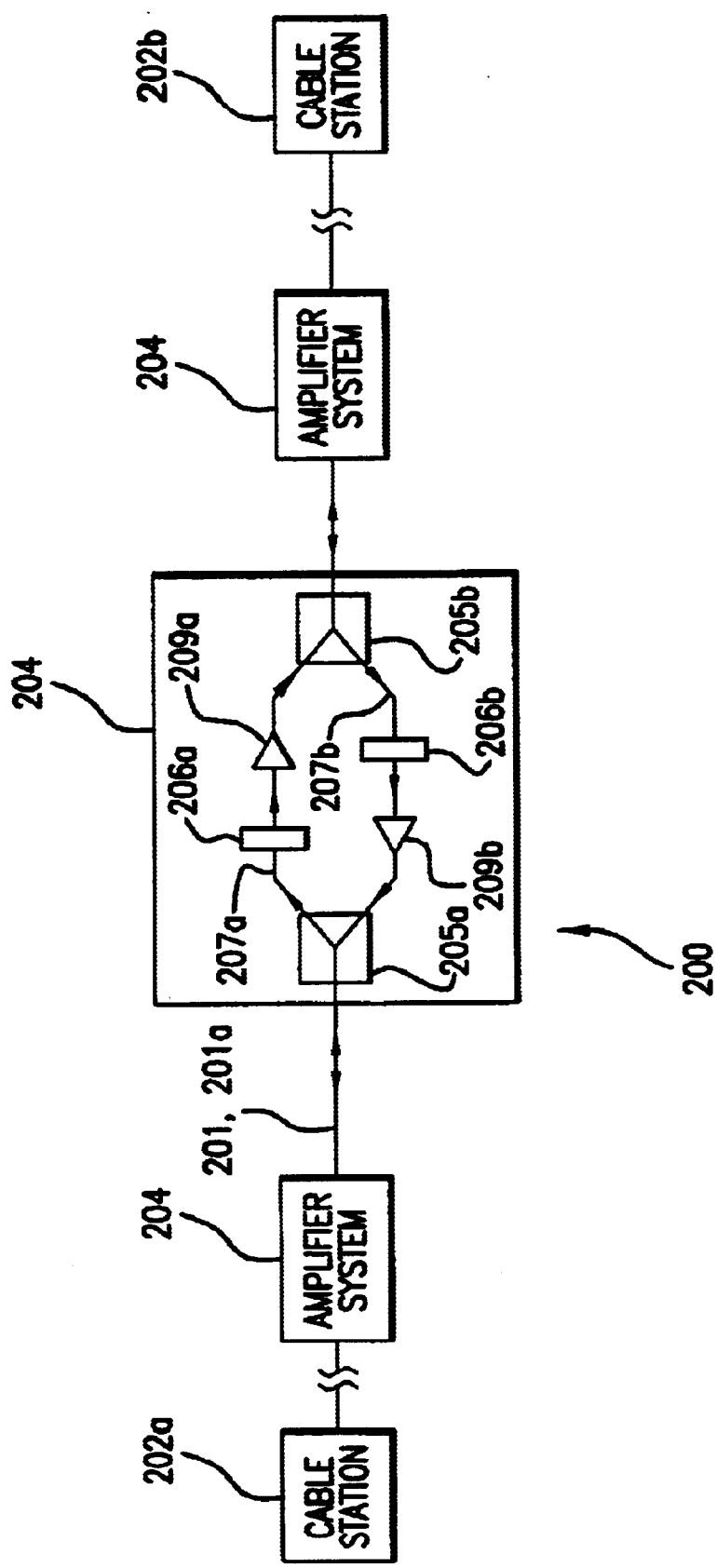
FIG. 2 shows a general system diagram of a preferred embodiment of the cable system of the present invention which supports counter-propagating signals.

FIG. 2 shows a high-level schematic diagram of a cable system 200 employing the interleaving, counter-propagating signal approach of the present invention. System 200 comprises at least one long-haul optical fiber 201 having a plurality of optical fibers 201a. Optical signals are transmitted and received by transmitters/receivers in cable stations 202a and 202b on either side of the cable 201. Between cable stations 202a and 202b are a plurality of optical amplifier systems 204. The optical amplifier systems 204 of the present invention are configured to support counter-propagating forward and backward signals in interleaving forward and backward channels $CH_1$ and $CH_2$, respectively.

In a preferred embodiment, the optical amplifier system 204 comprises multiplexer/demultiplexer 205a, 205b, where multiplexer/demultiplexer 205a is upstream of multiplexer/demultiplexer 205b relative to the propagation of the forward-propagating signals. The multiplexer/demultiplexers preferably function both (1) to interleave counter-propagating signals on an optical fiber 201a, and (2) to isolate counter-propagating channels on the optical fiber 201a.

An important function of the amplifier system is performed by interleaving filters 206a, 206b which filter their respective interleaving channels, $CH_1$, $CH_2$, to reduce the level of BRS. As mentioned above in the Summary of the Invention, the applicants have recognized that the effect of BRS caused by cascading amplifications between cable stations would be problematic and would reduce the SNR to unacceptable levels if left unchecked. By filtering BRS, however, the effects of cascading amplifiers is diminished, thereby maintaining acceptable SNR values.

The amplifier system 200 also comprises amplifiers 209a and 209b which amplify $CH_1$ and $CH_2$ on each discrete fiber 207a and 207b, respectively.

In operation, a forward signal of $CH_1$ propagating in the forward direction is isolated on a discrete fiber 207a prior to amplification by multiplexer/demultiplexer 205a. Likewise, a backward-propagating signal of $CH_2$ counter-propagating in the backward-propagating direction is isolated on a discrete fiber 207b prior to amplification by multiplexer/demultiplexer 205b. Filters 206a, 206b reduce the levels of BRS caused by the backward and forward-propagating signals of $CH_2$ and $CH_1$, respectively. Next, the signals of $CH_1$, $CH_2$ are amplified in amplifiers 209a and 209b, respectively. The amplified signals, $CH_1$, $CH_2$, on each discrete fiber 207a, 207b then are combined on a common optical fiber 201a by multiplexer/demultiplexer 205b, 205a.

It should be understood that the compartmentalization of the functionality of the amplifier system 200 described above is for illustrative purposes and should not be construed to limit the scope of the claimed invention. Certain functions may be combined into integral components or the functions may be allocated among additional discrete components. For example, the multiplexing/demultiplexing functions could be performed using discrete components, or the multiplexing/demultiplexing and filtering functions may be performed with a single component. Additionally, it should be understood that the sequence of filtering and amplifying may be reversed and additional filters and amplifiers may be used on each discrete fiber without departing from the present invention.

According to present invention, cascading amplifiers for counter-propagating signals of $CH_1$ and $CH_2$ may be used on a long-haul cable system while avoiding the deleterious effects of BRS. In a preferred embodiment, the cable system of present invention comprises at least about 20 amplifiers between cable stations, and, more preferably, at least about 100 amplifiers between cable stations. Since the invention facilitates an increased number of amplifiers between cable stations, it consequently provides for longer distances between cable stations. In a preferred embodiment, the distance between repeaters is at least about 20 km and, more preferably, at least about 40 km. In this way, counter-propagating signals can be used on long-haul optical fibers having a length preferably of at least about 1,000 km, and, more preferably, of at least about 6,000 km.

Figure 3:
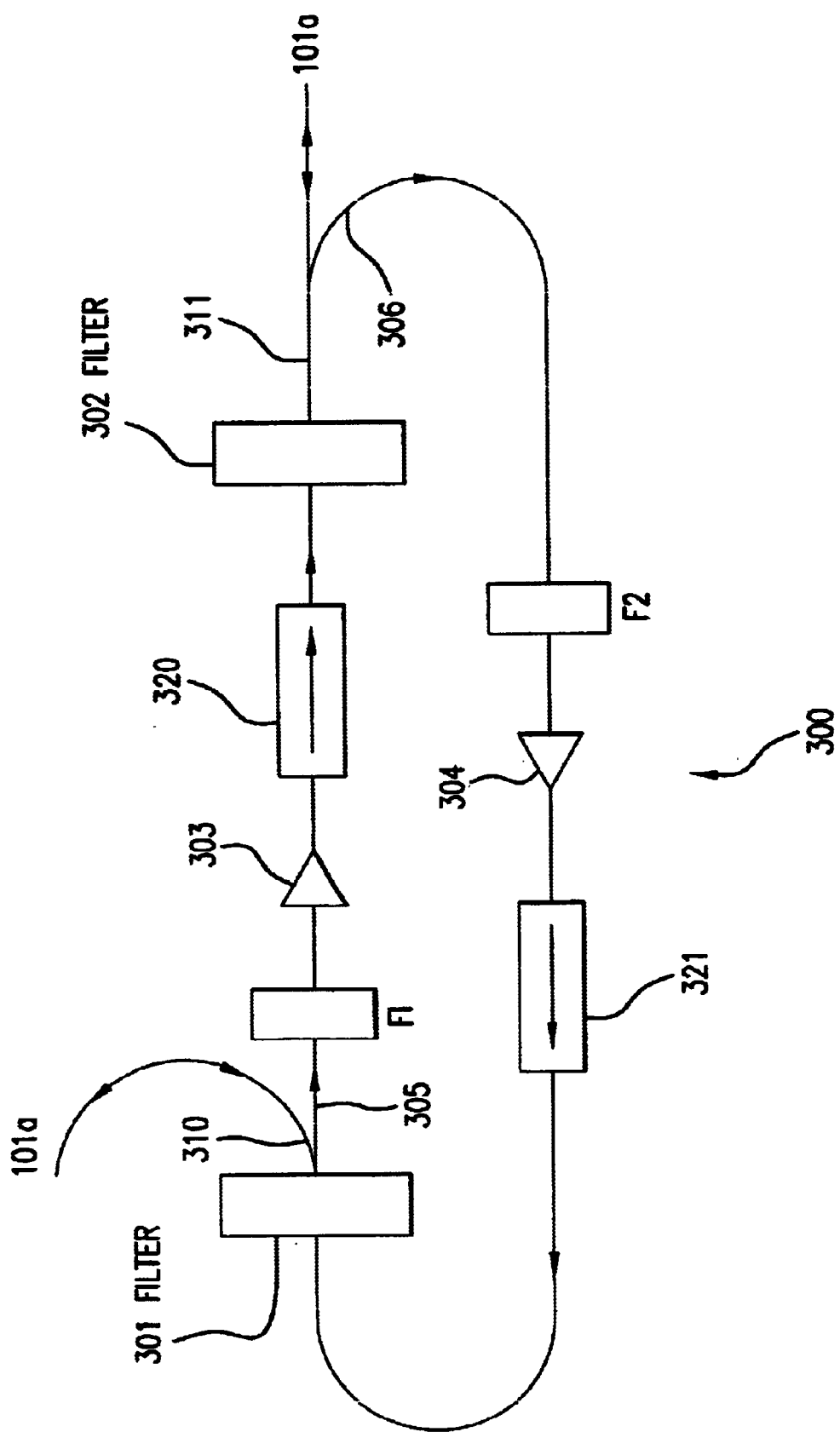
FIG. 3 shows a preferred embodiment of the amplifier system of the present invention for reducing BRS and amplifying counter-propagating signals over long-hauls.

Referring back to the drawings, FIG. 3 depicts a schematic diagram of a preferred embodiment of the amplifier system 300. This embodiment uses interleaving filters to perform the functions of isolating, filtering and combining the counter-propagating signals. A conventional interleaving filter comprises a reflective port, a transmission port, and a common port. In operation, if forward-propagating signals of a particular wavelength are coupled to the common port of an interleaving filter configured to let such a wavelength pass, they will be transmitted to the transmission port. If backward-propagating signals of a different wavelength are coupled to the reflective port of the same interleaving filter, they will be transmitted to the common port. Accordingly, as discussed below, a combination of interleaving filters can be configured to interleave/isolate signals of different wavelengths.

The amplifier system 300 shown in FIG. 3 comprises an $CH_2$-pass interleaving filter 301 and an $CH_1$-pass interleaving filter 302, wherein the $CH_2$-pass interleaving filter 301 is upstream of the $CH_1$-pass interleaving filter 302 relative to the propagation of the signals of $CH_1$. The end of one section 310 of optical fiber 101a is coupled to the reflective port of the $CH_2$-pass interleaving filter while the end of another section 311 of optical fiber 101a is connected to the reflective port of the $CH_1$-pass interleaving filter 302. Discrete optical fibers 305 and 306 connect the interleaving filters. Specifically, optical fiber 305 couples the reflection port of $CH_2$-pass interleaving filter 301 to the transmission port of the $CH_1$-pass interleaving filter 302 such that $CH_1$ is transmitted and filtered by the $CH_1$-pass interleaving filter 302 and combined with the section 311 of optical fiber 101a. Likewise, optical fiber 306 couples the reflection port of $CH_1$-pass interleaving filter 302 to the transmission port of the $CH_2$-pass interleaving filter 301 such that $CH_2$-pass is transmitted and filtered by the $CH_2$ interleaving filter 301 and combined with the section 310 of optical fiber 101a. Accordingly, interleaving filters isolate counter-propagating signals, filter and interleave the counter-propagating signals on a single fiber. For example, with respect to $CH_2$-pass interleaving filter 301, it serves to isolate the signals of $CH_1$ from the counter-propagating signals of $CH_2$ on the optical fiber 101a and also serves to filter and interleave the signals of $CH_2$ entering through its transmission port with the optical fiber 101a. Suitable interleaving filters are known in the art and are commercially available through JDS Uniphase (Canada and USA).

Optionally, one or more interleaving filters F1 and F2 may be disposed on the discrete fibers 305 and 306, respectively, to increase the degree of filtering of the signal and further reduce the level of BRS. Filters F1 and F2 are configured to only pass wavelengths corresponding to the first and second channels. Suitable filters include Fabry-Perot filters and Mach-Zehnder wavelength multiplexers.

Optionally, one or more isolators 320 and 321 may be disposed or the discrete fibers 305 and 306 respectively to isolate counter-propagating signals/noise on the discrete fibers.

Amplifiers 303 and 304 are disposed on discrete fibers 305 and 306 and amplify $CH_1$, $CH_2$, respectively. Suitable amplifiers are known in the art and include, for example, EDFA amplifiers and/or Raman amplifiers. And are commercially available through JDS Uniphase and are available though Lucent Technologies (Holmdel, N.J.).

In operation, signals of $CH_1$ propagating in the forward direction on a portion 310 of optical fiber 101a is coupled to CH2-pass interleaving filter 301. Accordingly, signals of $CH_1$ are reflected from CH2-pass interleaving filter 301 onto discrete fiber 305. Optical amplifier 303 is configured to amplify the signals of $CH_1$. The amplified signals of $CH_1$ are then coupled to the transmission port of $CH_2$-pass interleaving filter 302. Accordingly, the amplified signals of $CH_1$ are filtered and combined with section 311 of the optical fiber 101a by passing through the transmission port of $CH_2$-pass interleaving filter 302. Likewise, the signals of $CH_2$ propagating in the backward direction are coupled to the common port of $CH_2$-pass interleaving filter 302 where it is reflected onto discrete fiber 306. They are then amplified by amplifier 304 using conventional means and coupled to the transmission port of $CH_2$-pass interleaving filter 301. The interleaving filter 301 filters amplified signals of $CH_2$ before combining it with counter-propagating signals of $CH_1$ on section 310 of optical fiber 101a. Optionally, interleaving filters F1 and F2 on discrete fiber 306 and 305 may be used to filter the signals of $CH_1$ and $CH_2$ if greater reduction in BRS is desired.

Although the amplifier configuration of FIG. 3 is preferred, multiple combinations of interleaving filters are possible with the scope of the present invention. For example, the transmission port may be used as an input into the amplifier system and the reflective port used as an output.

Figure 4:
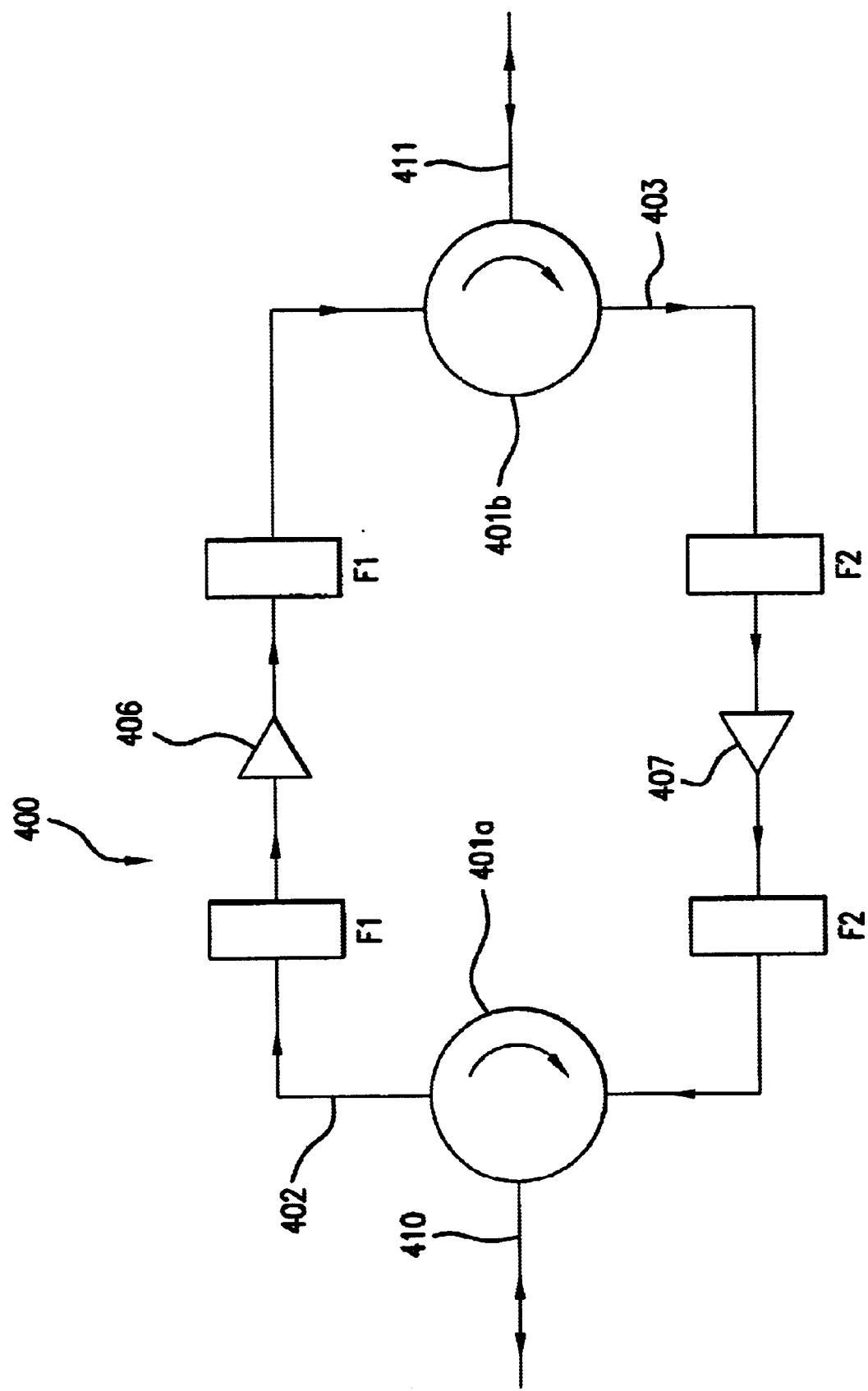
FIG. 4 shows another preferred embodiment of the amplifier system of the present invention for reducing BRS and amplifying counter-propagating signals over long-hauls.

Alternatively, rather than relying on interleaving filters to effect the isolation and filtering of the various bandwidths, circulators 401a and 401b can be used as schematically represented in the optical amplifier system 400 shown in FIG. 4. Circulator 401a serves to direct signals propagating in the forward direction on a section 410 of optical fiber 101a to a discrete fiber 402 and to combine signals propagating in the backward direction on a discrete fiber 403 with counter-propagating signals on section 410 of optical fiber 101a. Likewise, circulator 401b serves to direct signals propagating in the backward direction on section 411 of optical fiber 101a to discrete fiber 403 and to combine signals propagating in the forward direction on discrete fiber 402 with counter-propagating signals on section 411 of optical fiber 101a.

One or more interleaving filters F1 and F2 are also disposed on discrete fibers 402 and 403 respectively. Such filters are used to reduce BRS. To this end, interleaving filters F1 and F2 are $CH_1$-pass and $CH_2$-pass interleaving filters, respectively. Although two interleaving filters are depicted on each discrete fiber 402 and 403, the invention may be practiced with just one interleaving filter on either side of the amplifier of each discrete fiber, or with a plurality of interleaving filters on either side of the amplifiers on each discrete fiber.

Optical amplifiers 406, 407 are disposed on discrete fibers 402 and 403 respectively. As with the embodiment in FIG. 2, optical amplifiers 406 and 407 are well known in the art.

In operation, signals of $CH_1$ propagating in the forward direction are directed onto discrete fiber 402 by circulator 401a where they are then filtered by F1 to remove or reduce BRS. Next, amplifier 406 amplifies the signals. The amplified signal may be subject to additional filtering in interleaving filter F1 before it is combined with optical fiber 101a by circulator 401b. Likewise, signals of $CH_2$ counter-propagating in the backward direction on optical fiber 101a are directed to discrete fiber 403 by circulator 401b where they are filtered by F2 to remove or reduce BRS. The filtered signals are then amplified in amplifier 407. The amplified signals may undergo additional filtering in interleaving filter F2 before being combined with fiber 101a by circulator 401a.

What is claimed is:

1. A method of increasing capacity on a long-haul cable system having at least one optical fiber, said method comprising:
    interleaving counter-propagating forward-propagating and backward-propagating signals in forward and backward channels, respectively, within the C-band on a common optical fiber, wherein the wavelength offset in GHz between said forward and backward channels is no greater than about 3 times the bit rate over said fiber in Gb/s.

2. The method of claim 1, wherein said wavelength offset is no greater than about 50 GHz.

3. The method of claim 2, wherein said wavelength offset is no greater than about 30 GHz.

4. The method of claim 1, wherein said wavelength offset is no greater than about 20 GHz.

5. The method of claim 4, wherein the number of forward and backward channels in the C-band is greater than about 5.

6. The method of claim 5, wherein the number of forward and backward channels in the C-band is greater than about 10.

7. The method of claim 1, further comprising the step of amplifying said forward-propagating and backward-propagating signals, the step of amplifying comprising:
    isolating said forward-propagating and backward-propagating signals to obtain isolated forward-propagating and backward-propagating signals in isolated forward and backward channels;
    reducing the level of BRS in said isolated forward and backward channels;
    amplifying said isolated forward-propagating and backward-propagating signals; and
    combining said isolated forward-propagating and backward-propagating signals signals on said optical fiber.

8. The method of claim 7, wherein the steps of isolating and combining are performed using circulators.

9. The method of claim 7, wherein the steps of isolating, reducing the level of BRS, and combining are performed using a configuration of two or more interleaving filters.

10. The method of claim 9, wherein said interleaving filters comprise first and second interleaving filter configured such that said forward-propagating signals are isolated from said optical fiber using a reflective port of said first interleaving filter and are filtered and combined with the optical fiber using a transmission port of said second interleaving filter, and said backward-propagating signals are isolated from said optical fiber using a reflective port of said second interleaving filter and are filtered and combined with the optical fiber using a transmission port of said first interleaving filter.

11. An undersea cable system comprising:
    an undersea cable comprising at least one optical fiber;
    at least one transmitter/receiver for transmitting and receiving forward-propagating and backward-propagating signals in forward and backward interleaving channels within the C-band on a common optical fiber, wherein the wavelength offset in GHz between said forward and backward channels is no greater than about 3 times the bit rate over said fiber in Gb/s.

12. The cable system of claim 11, further comprising:
    at least one amplifier system comprising:
        optics configured for isolating interleaving, counter-propagating forward-propagating and backward-propagating signals in isolated forward and backward channels, respectively, on discrete fibers, reducing BRS on said discrete fibers, and combining said forward-propagating and backward-propagating signals on said optical fiber;
        at least one amplifier on each discrete fiber for band amplifying said forward-propagating and backward-propagating signals.

13. The cable system of claim 12, wherein said submarine cable system comprises at least about 20 amplification systems between cable stations.

14. The cable system of claim 11, wherein said undersea cable is at least about 1,000 km in length.

15. The cable system of claim 12, wherein said optics comprises an interleaving filter for filtering said forward-propagating signal to remove wavelengths not corresponding to said forward channels, wherein said filter requires a minimum channel spacing to filter said forward channels.

16. The cable system of claim 15, wherein said wavelength offset is less than the minimum channel spacing of said interleaving filter.

* * * * *